United States Patent [19]

Diehl

[11] Patent Number: 5,774,203
[45] Date of Patent: Jun. 30, 1998

[54] SELF-CONTAINED FILM EXPOSING/ DEVELOPING MACHINE

[76] Inventor: John G. Diehl, 22601 Corteville, St. Clair Shores, Mich. 48081

[21] Appl. No.: 339,503

[22] Filed: Nov. 14, 1994

Related U.S. Application Data

[63] Continuation-in-part of Ser. No. 305,086, Sep. 13, 1994, abandoned.

[51] Int. Cl.⁶ .............................. G03B 27/32; G03B 27/20
[52] U.S. Cl. ................................ 355/27; 355/93; 355/100
[58] Field of Search ................................ 355/91, 93, 100, 355/106, 19, 27, 94, 128

[56] References Cited

U.S. PATENT DOCUMENTS

| | | | |
|---|---|---|---|
| 3,176,601 | 4/1965 | Bradley | 355/91 X |
| 3,554,644 | 1/1971 | Michalski | 355/93 X |
| 3,635,599 | 1/1972 | Harrell et al. | 355/91 X |
| 3,888,586 | 6/1975 | Arden et al. | 355/93 X |
| 4,754,309 | 6/1988 | Lesko | 355/91 |
| 4,885,603 | 12/1989 | Tomizawa et al. | 355/106 X |
| 5,204,711 | 4/1993 | Takubo et al. | 355/93 X |

*Primary Examiner*—Fred L. Braun
*Attorney, Agent, or Firm*—Harness Dickey & Pierce, P.L.C.

[57] ABSTRACT

A self-contained machine for light exposing and developing images on a film requiring at least a film-activating operation prior to light exposure of an image and a heat development operation following exposure. The machine provides automated handling of the film in a light tight environment for convenient and rapid processing of such films. The machine includes mechanisms for handling and transporting the film and applying electrical charges and heat as required for new generation digital films.

18 Claims, 9 Drawing Sheets

SELF-CONTAINED FILM EXPOSING/ DEVELOPING MACHINE

CROSS REFERENCE TO RELATED APPLICATION

This application is a continuation-in-part of U.S. application Ser. No. 08/305,086, filed Sep. 13, 1994, now abandoned.

FIELD OF THE INVENTION

This invention relates generally to the formation of images on film through light exposure, and more particularly to a self-contained machine providing a light blocking enclosure for light exposing images on a film requiring at least a film-activating operation prior to light exposure of an image and a heat development step following exposure.

BACKGROUND OF THE INVENTION

In the graphics art industry it is common to record a high resolution image on film, printing plates and paper. Traditionally, silver halide films have been used to produce a light-transmitted image onto the film. Exposing machines for contacts (reverses) and duplicates of an original negative (or positive) image using this traditional film are well known and consist of a blanket frame including a flexible impervious blanket and a glass frame juxtaposed in snug registry with a peripheral sealing bead, defining a contact printing chamber. Hinges or other linkage interconnect the glass and blanket frame so that one may be elevated with respect to the other in order to permit loading the film and original image. A vacuum source is provided having a conduit for providing vacuum communication to the printing chamber. The flexible blanket of the blanket frame is drawn tightly and snugly up against the glass of the glass frame after which a light is presented to the frame assembly for exposing the film. The film is then subsequently developed by processing it through a series of chemical baths which develop the film and trap the image therein. The developed film is then used to transfer the image from the film onto lithographic printing plates, proofing materials, screen frames, printed circuit boards, etc.

A new category of image-recording film has been developed by Xerox Corporation under the name Verde Digital Film which requires special handling. One type of the film is referred to as Verde VSX and requires an activation stage and a development stage during utilization. First, a negative electrical charge must be applied to the emulsion side of the film, subsequent to which an image is positioned in vacuum contact thereagainst, and a light exposure is provided. Subsequently, the back face of the film is heated which develops the film to trap an image photographically therein.

Another example of this new generation film is referred to as Verde VIX and requires an activation, deactivation, and heat development stage in order to form an image therein. First, a positive charge is applied to the emulsion side of the film, subsequent to which an image is positioned in vacuum contact thereagainst, and a light exposure is provided. A flood lamp exposure is subsequently provided to the emulsion side of the film, and then a negative charge is provided also on the emulsion side to deactivate the film. Finally, heat is applied to the film back face which develops the film and traps an image therein.

This new generation of film has a number of desirable attributes over conventional films. One important feature is that the film is not light sensitive until an electric charge has been applied. This eliminates the problem with more conventional films of handling the film prior to exposure which damages it. Furthermore, no chemicals are used to process the film. The chemicals used to process conventional films are environmentally unfriendly and may create health hazards and storage risks, thereby increasing the cost of processing conventional film.

As mentioned previously, this new film however requires a number of additional steps during use. These steps must be done in the dark since once the film is activated but before it is developed the film is sensitive to any light. Although these steps are easily adapted to scanner/image setters where film is on a roll, to date, there is no good way to make a contact (reverse image) or duplicate of the film which most users will require. The only way contemplated is that these steps would be carried out manually in a darkroom with a traditional exposing machine and separate stations for charging and heating the film.

Since most users do not already have a darkroom, an expensive light-blocking enclosure or darkroom would have to be constructed which completely encloses the work area. Darkroom enclosures are typically constructed from entire rooms which have sealed doors and light blocking ventilation systems. Great care would have to be taken to prevent the introduction of light into the darkroom which would expose and ruin the film. Furthermore, an operator carrying out each of the steps manually in the dark has a great likelihood of mishandling the film and thus ruining it.

SUMMARY OF THE INVENTION

In view of this, there is a need for a compact machine for processing digital films which automates the exposure process, and can be used in traditional printing shop settings without a dedicated darkroom.

In accordance with this invention a self-contained light-blocking machine is disclosed which allows an operator to insert an image-recording film while in an in-active state into the machine of this invention, subsequent to which the door is closed to prevent light from entering therein. The film-loaded machine then performs a series of preferably automated operations which activate the film, expose the film to a negative (or positive) image, and subsequently heat develop the film to lock the image therein.

Objects, features and advantages of this invention are to provide a self-contained film processing machine which is relatively small, compact, self supporting, rugged, durable, readily and easily packaged, and allows an operator to insert an image and film into the machine where the film is subsequently activated, exposed, and developed. Once the film is loaded, it is processed inside a completely enclosed light-blocking environment. The device of this invention is furthermore easily microprocessor controlled utilizing electric motors and pneumatic (or solenoid) valves , and a variety of electrical sensing and detecting switches which allow for complete detection of the machine operation, save for introduction of a film and negative (or positive) image therein by an operator external to the machine.

BRIEF DESCRIPTION OF THE DRAWINGS

These and other objects and advantages of this invention will be apparent from the appended claims, following detailed description and accompanying drawings in which:

DETAILED DESCRIPTION OF THE PREFERRED EMBODIMENT

Figure 1:
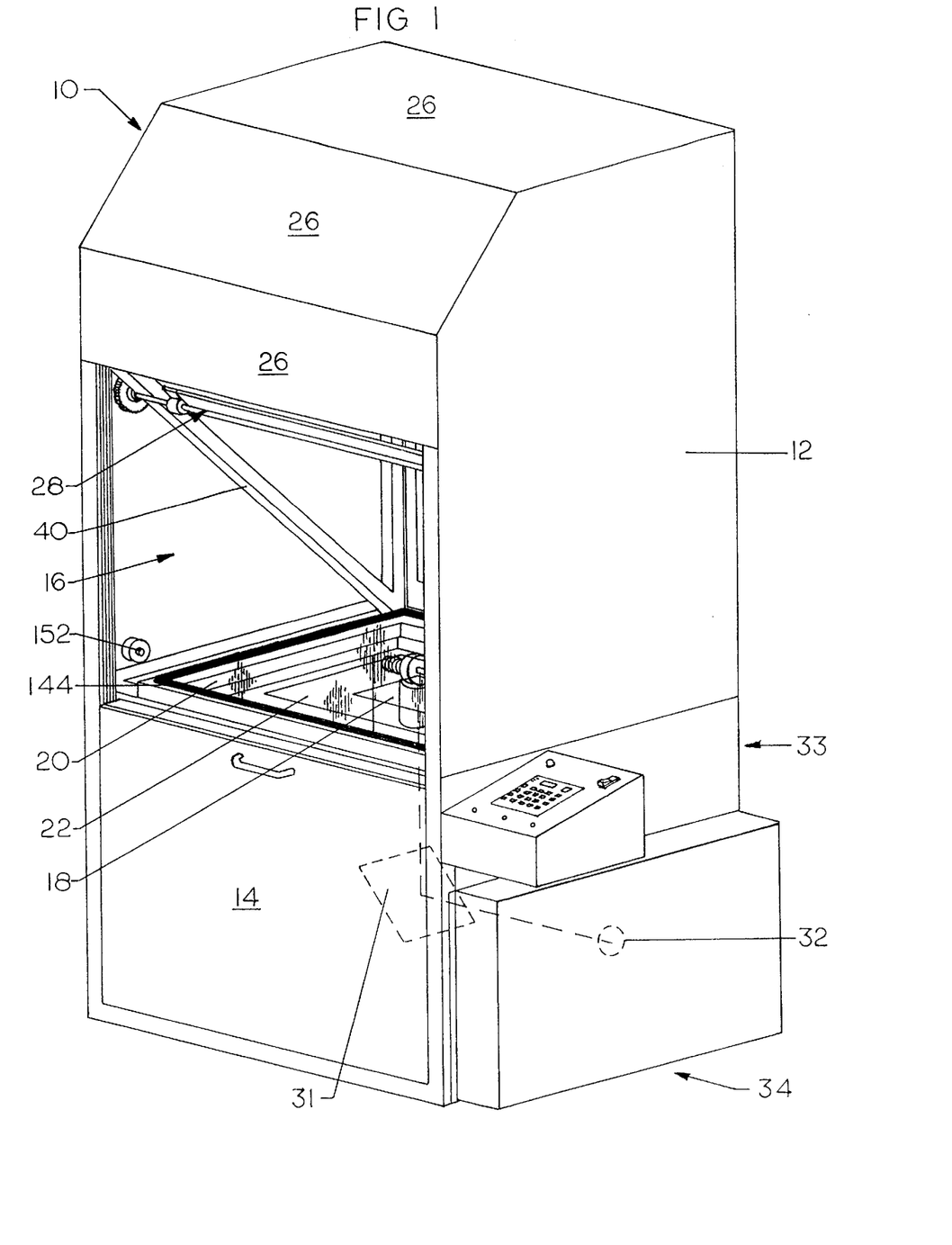
FIG. 1 is a perspective view of a self-contained film processing machine embodying the invention.

FIG. 1 illustrates a self-contained film processing machine having a light-blocking barrier enclosure 12 including a door 14 movable between open and close positions which defines an opening 16. A negative (or positive) image 18 is placed on a glass frame 20 and a film 22 which will later be activated, exposed and heat developed is then placed over it. The film 22 is a new generation of image-recording film which is not light sensitive until an electric charge is applied to activate the film afterwhich it is exposed and subsequently heat developed in order to trap an image photographically on the film. The barrier enclosure 12 includes a framework 24 which is substantially completely encased by panels 26 in combination with door 14 which when completely closed seals light from entering therein. To activate the film 22, an electrostatic charging carriage 28 is supported on the framework 24 where it is passed over the film as it is held in close parallel proximity to the carrier. Furthermore, a heating element 30 is likewise provided on the framework 24 for heat developing the film 22 as it is passed in contact with the heater which develops the film subsequent to exposing it to light. A point light source 32, which is preferably reflected off a mirror 31 is provided in a base portion 33 of the machine beneath the glass frame 20 which exposes the photographic negative (or positive) image 18 on the film 22. A microprocessor-based control box 34 is also provided which regulates the activation of valves (to direct the flow of the vacuum pump), cylinders and motion-producing components in machine 10. Furthermore, limit switches are monitored to facilitate control of the machine 10 through the microprocessor-based control box 34.

Figure 2:
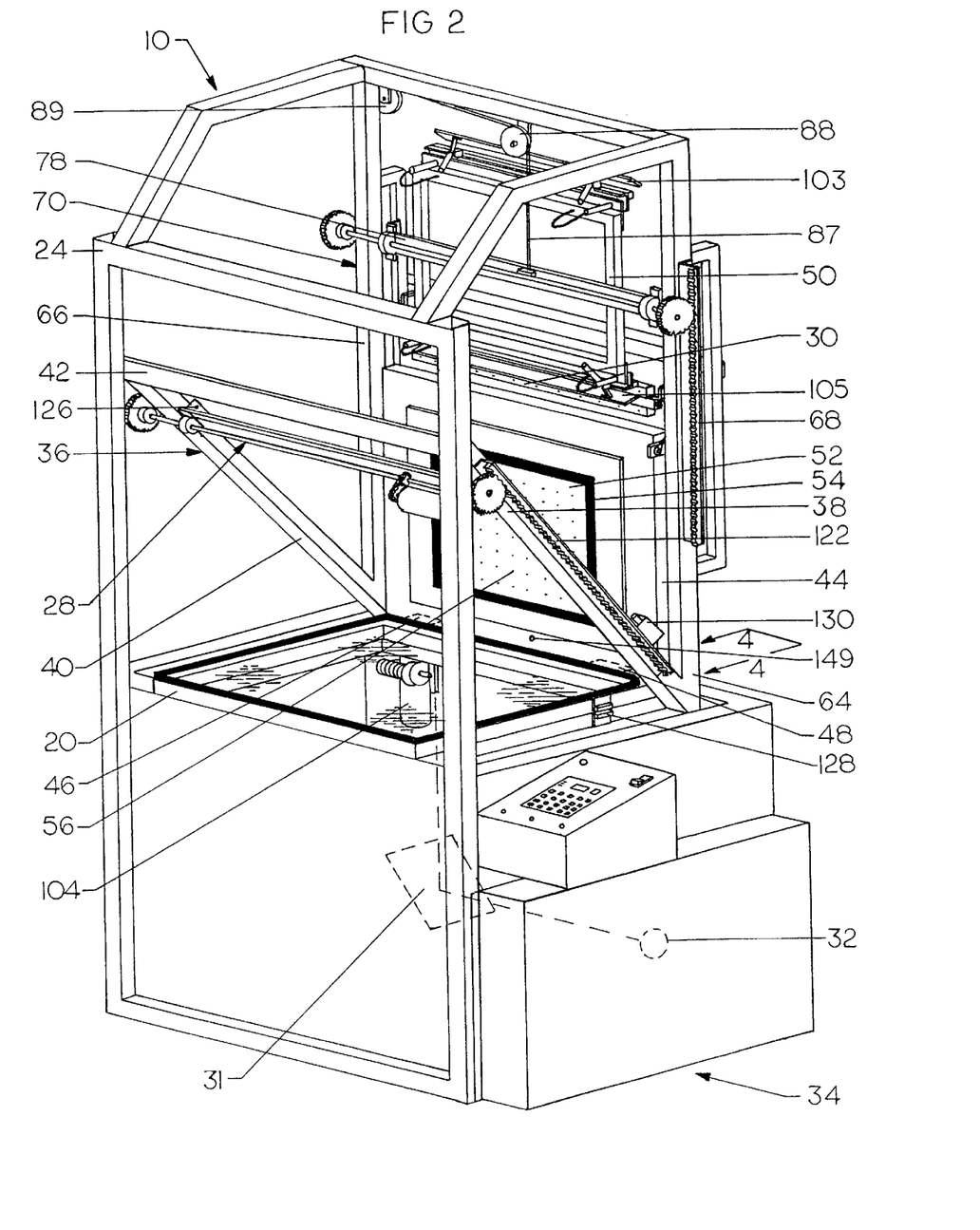
FIG. 2 is a perspective view of a device of FIG. 1 with selected exterior panels omitted to show interior structural components contained therein.

FIG. 2 shows the film processing machine 10 with selected exterior panels omitted from the framework 24 in order to better depict the layout of internal structural components contained therein. Framework 24 includes a charging carriage support frame 36 constructed from a pair of diagonal members 38 and 40 and a horizontal member 42 which supports the charging carrier 28 while it is axially displaced along the diagonal members 38 and 40. Glass frame 20 is horizontally supported in the enclosure 12 beneath which the light source 32 is contained for light-exposing the film 22 through glass frame 20 on which the image 18 and film 22 are supported. Additionally, the heating element 30 is horizontally positioned across the back portion of the framework 24 beneath which is pivotally supported a blanket frame 44 which pivots about hinges 46 and 48 between vertical and horizontal positions. A vacuum carriage 50 is also provided on framework 24 which is movable between raised and lowered positions therealong for transporting light-exposed film 22 during the development stage of operation.

Figure 4:
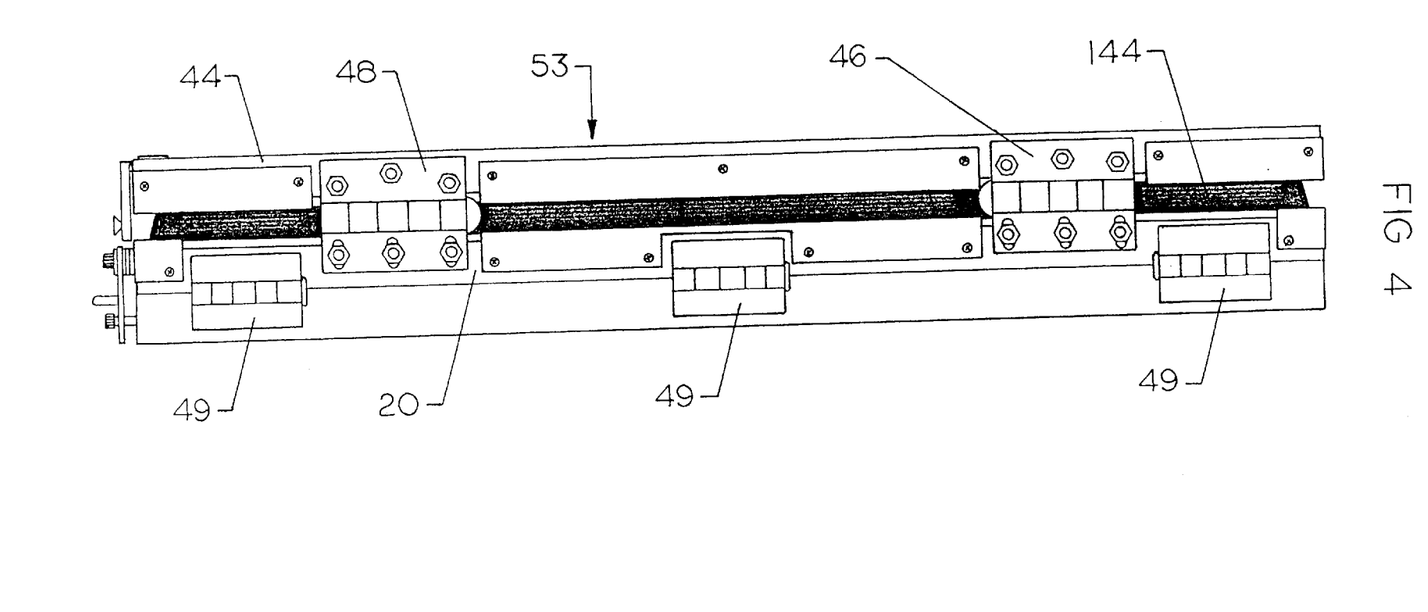
FIG. 4 is a partial perspective edge view of the glass frame taken generally along 4—4 of FIG. 2.

FIG. 4 depicts generally the blanket frame 44 in its closed, or horizontal position. Blanket frame 44 is rotatably connected via hinges 46 and 48 to the edge of glass frame 20. Furthermore, the glass frame 20 is likewise hingedly connected via hinges 49 which facilitates raising of the glass frame to change and maintain the light source 32. Seal 144 is furthermore depicted between frames 20 and 44.

The blanket frame 44 is rotatably supported inside the enclosure 12 and vacuum engages with the film 22 while in a horizontal position over negative 18 where it is initially placed on the glass frame 20 at the start of an image copying cycle. The blanket frame 44 has a substantially flush platen face 52 formed from a sheet of Acrylic which is secured to a larger piece of PVC plastic plate 53, with screws 57 provided substantially about the periphery of inner platen 52 which extend thru plate 52 and a double face tape provided between inner platen 52 and plate 53 into the backside of plate 53 forming a chamber between the pair. A foam rubber seal 54 is provided on the outer surface of inner platen 52 substantially about the periphery of said chamber and both the face and seal have perforations 56 which communicate to said chamber through which a vacuum is applied to engage the film 22 against the platen face. When vacuum-engaged, the platen can be rotated to pick up and carry the film between horizontal and vertical positions. A cable 58 is affixed to a top edge of the blanket frame where it passes through a pulley 60 and down to an electric motor and drum 62 which is electrically activated to retract and extend the cable and pivotally raise and lower the blanket frame while transporting a piece of film 22.

The heating element 30 as depicted in FIG. 2 is positioned above the blanket frame 44 when raised to an elevated, or vertical position. The heating element 30 is affixed at either end to vertical support bars 61 and 63 on the back of each vertical member 64 and 66, respectively, which form part of framework 24. The blanket frame is nested flush between vertical members 64 and 66 in its vertically elevated position, and heating element is positioned vertically above, in slightly spaced-apart relationship. The heating element 30 is electrically controlled during operation of the machine 10, in order to apply heat to the film as the vacuum carriage 50 whose operation will be discussed generally hereinafter, passed by it.

The vacuum carriage 50 is vertically translated between raised and lowered positions along vertical members 64 and 66 against which it is guided by a pair of linear gear racks 68 and 70 which are affixed to each of member 64 and 66, respectively. A pair of rotary gears 72 and 74 provided at either end of the vacuum carriage 50 respectively mate with each of racks 68 and 70. Each rotary gear 72 and 74 is held in biased engagement with each rack 68 and 70, respectively, by a pair of rolling contact elements 76 which engage with the opposed back faces of vertical members 64 and 66, respectively, to maintain the rotary gears in meshed engagement with the linear gear racks during vertical motion of the vacuum carriage. Furthermore, the pairs of rolling contact elements 76 are provided at each end of the carriage in spaced apart relationship which maintains the vacuum carriage 50 in vertical alignment as it is moved between raised and lowered positions.

Figure 5:
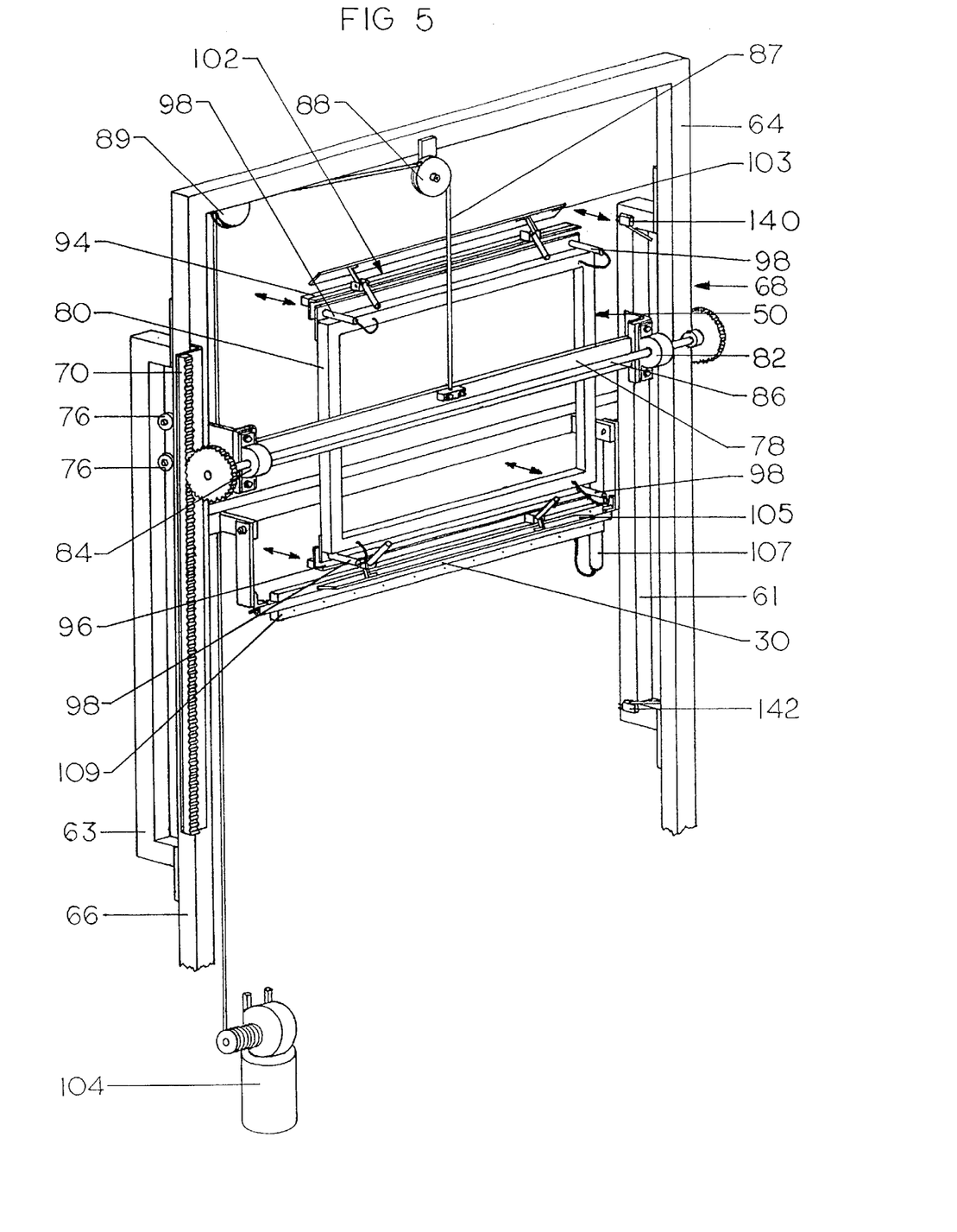
FIG. 5 is a partial perspective view of the vacuum carriage and heating element of FIGS. 1 and 2 with the vacuum carriage disposed in a raised position.

As shown in FIG. 5, the vacuum carriage 50 includes a main horizontal cross bar 78 which supports a vertical frame 80 therealong. Spaced apart pairs of the rolling contact elements 76 are affixed to the cross bar 78 in order to maintain the vertical alignment of the frame 80 between vertical members 64 and 66 during motion of the carriage therebetween. A pair of rotary bushings 82 and 84 support a rotary shaft 86 on the cross bar 78, and a rotary gear 72 and 74 is affixed at either end, respectively. A cable 87 is connected to cross bar 78 and passes through a pair of pulleys 88 and 89 on support frame 36 arranged above the vacuum carriage 50. An electric motor and drum 90 receives the other end of cable 87 to electrically raise and lower vacuum carriage 50 while it is transporting an exposed piece of film. The microprocessor-based control box 34 directs and controls activation of motor 90 in order to heat-develop a piece of exposed film as it is passed in contact with the heater element.

Vacuum carriage 50 is constructed and arranged to facilitate the lowering of the carriage substantially adjacent the blanket frame as it vacuum supports an exposed piece of film. The lowered carriage 50 is then biased in contact with the film 22 along a portion which laterally extends from the frame 80 in order to engage and pick up the piece of film 22. The engaged portion is then retracted and the carriage 50 is transported vertically past the heating element 30 in order to develop the exposed film. The engaging portion consists of a pair of horizontal vacuum bars 94 and 96 which are connected to top and bottom edges of frame 80, respectively, in horizontal arrangement, which are inwardly biased upon demand through extension and retraction of pneumatic cylinders 98 through which they are mounted to frame 80. When extended, the pneumatic cylinders engage the vacuum bars against a piece of film 22 which is vacuum supported in a vertical configuration on blanket frame 44. By lowering the vacuum carriage 50 to a lowered position substantially parallel with the blanket frame, cylinders 98 are pressurized so that they extend and engage the vacuum bars 94 and 96 against the top and bottom edges of the piece of film 22. Vacuum bars 94 and 96 both preferably have an elongated piece of foam rubber 100 on their engaging faces which have perforations 102 through which a vacuum is applied while engaged with the film. The bars support and carry the film away from the blanket frame, afterwhich it is raised toward an upward position and passed in contact with heating element 30 which heat develops the exposed film. After the cylinders are energized and the vacuum is applied to perforations 102, the vacuum on blanket frame 44 is released such that the film is completely supported between bars 94 and 96 in a vertical configuration.

Preferably, the vacuum bars 94 and 96 are actuated between extended and retracted positions by pairs of top and bottom cylinders 98 which converge at a slight angle as they are extended such that each bar axially extends from frame 80 at a slight incline toward the other bar so that extension of each bar decreases their spaced apart relative outer end positions as they contact a piece of film carried on the blanket frame 44. Thereinafter, the cylinders 98 are retracted which increases their spaced apart relation, thus assuring that a positive tension is maintained on the film between the top and bottom horizontal edges, along bars 94 and 96 with which they are vacuum retained. Preferably, a pair of top and bottom positive clamps 103 and 105 are then activated to clamp the film along bars 94 and 96, respectively, to further secure the film. Subsequently, motor 90 is energized to raise the carriage and film vertically. When the top positive clamp 103 is just above heating element 30, pneumatic cylinder 107 is activated causing the heating element to be pushed forward in close proximity to the film. The heating element 30 consists of a tubular heater inside of a rectangular copper bar which has a flush face with perforations 109 through which a low level vacuum is then applied to pull the film in physical contact with the heater element in order to heat develop the film as it is passed vertically therealong.

Figure 6:
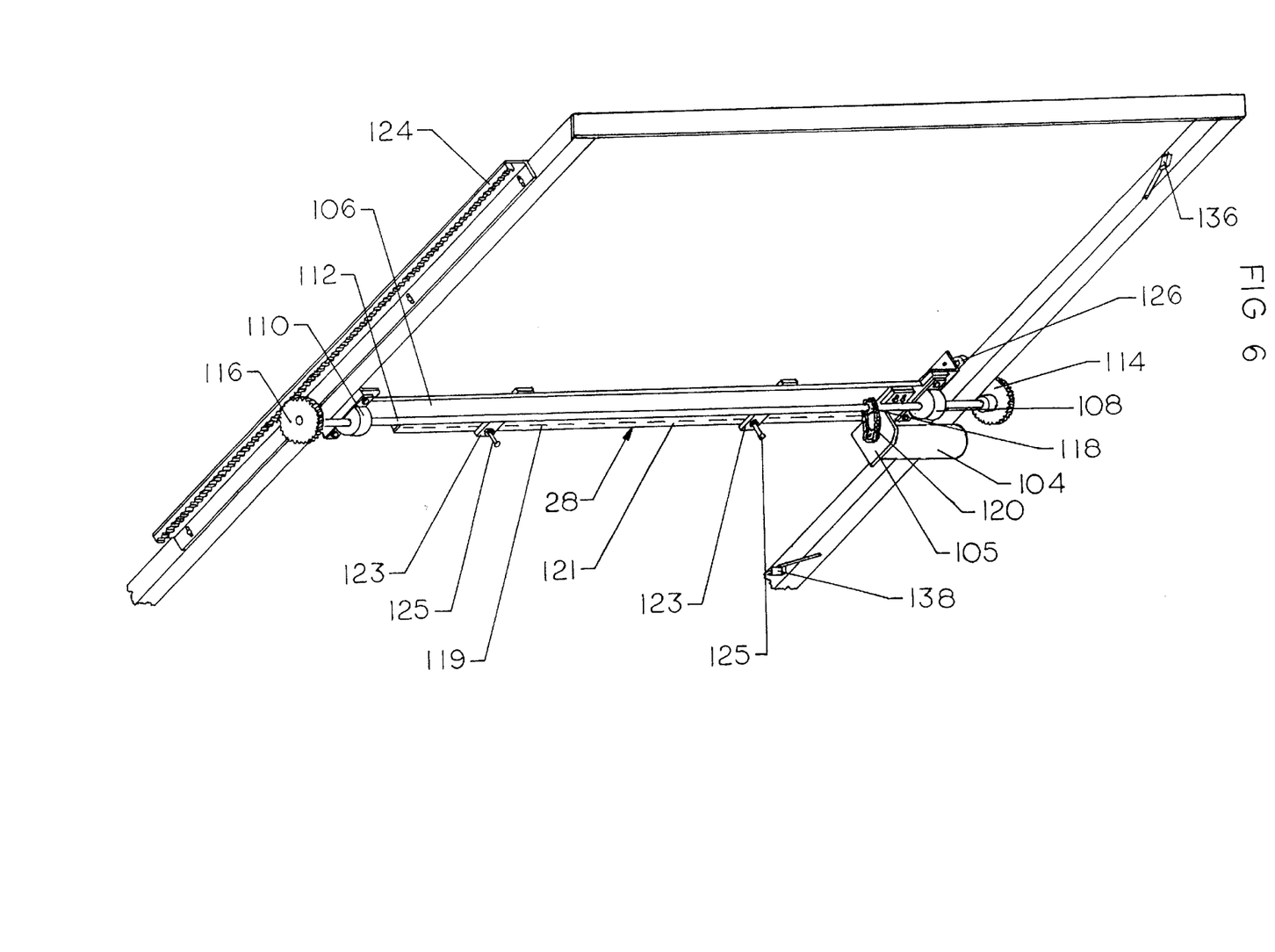
FIG. 6 is a partial perspective view of the charging carrier of the device of FIGS. 1 and 2 omitting various structural components to facilitate an operating description, and showing the charging carriage extended to a middle position.
Figure 7:
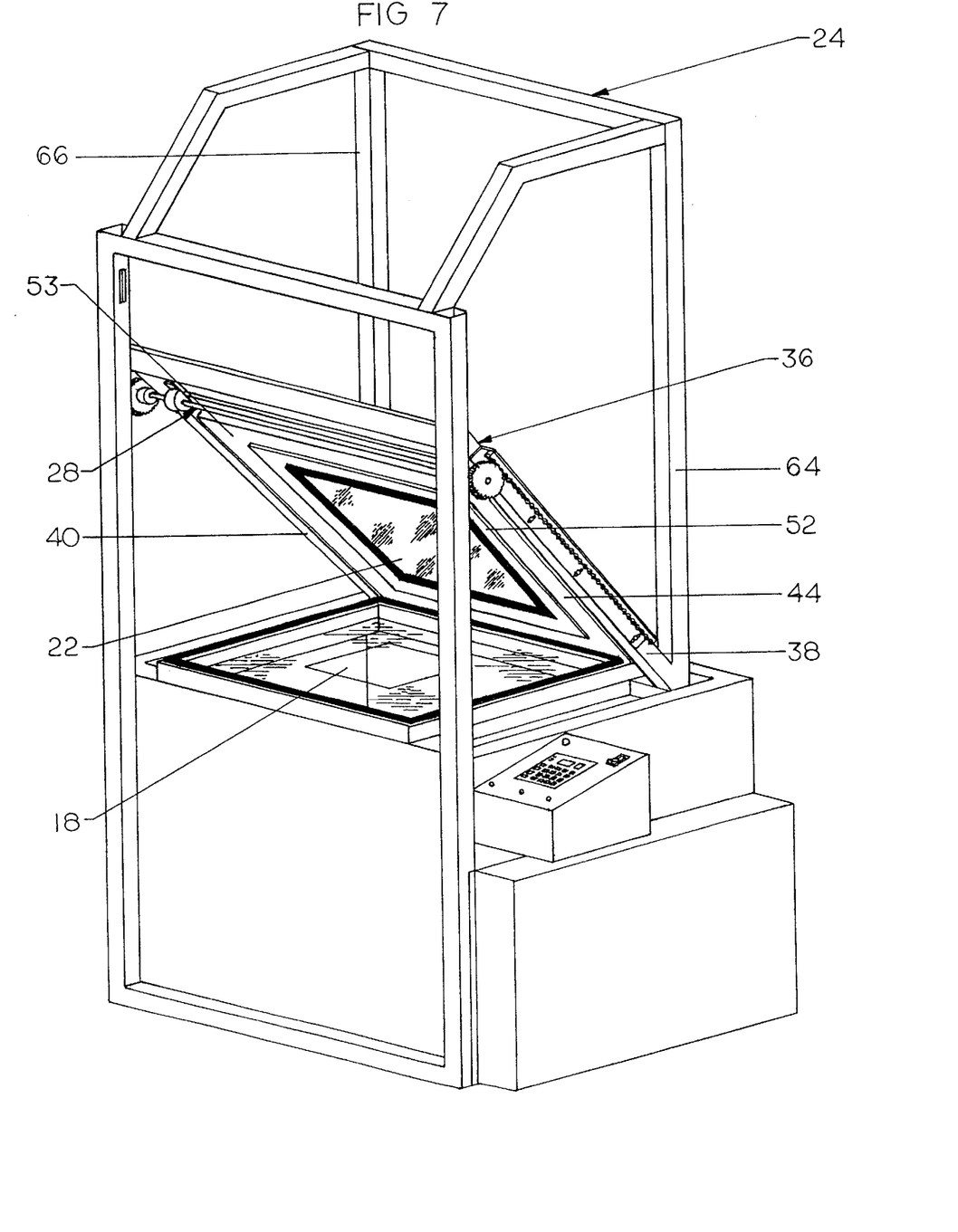
FIG. 7 is a partial perspective view of the device of FIGS. 1 and 2 and further omitting various structural components to facilitate an operating description, and depicting the blanket frame pivoted to an inclined position.

As shown in FIG. 6, the electrostatic charging conveyor 28 is moved between raised and lowered positions along support frame 36 through the action of an electric motor drive 104 affixed to a cross bar 106. The cross bar 106 has a pair of rotary bushings 108 and 110 which support a rotary shaft 112 including rotary gears 114 and 116 affixed at either end. A sprocket gear 118 is coupled via a chain 120 to the motor drive 104 such that the motor is electrically actuated to drive the sprocket and shaft which rotates the gears 114 and 116 and raises or lowers the carriage therealong. A pair of linear gear racks 122 and 124 are provided on diagonal members 38 and 40, respectively, against which the rotary gears 114 and 116 rotate in gear-meshed engagement. Spaced-apart pairs of rotary bushings 126 are provided on a back face of each gear rack, respectively, which maintain each gear in engagement with each rack, as well as support the cross bar 106 in planar relationship with the support frame 36 as they rotate in engagement with the back face of each rack.

In order to implement automated control of the self-contained film processing machine 10, it becomes necessary to incorporate sensing switches which monitor motion of the blanket frame 44 due to activation of motor 62, motion of electrostatic charging carriage 28 with respect to frame 36 and activation of motor 104, and motion of vacuum carriage 50 relative to framework 24 and activation of motor 90.

An electrical charging wire 119 is carried on charging carrier 28 to electrically charge and activate a piece of film 22 vacuum supported on carriage 50 while held in an inclined position between diagonal members 38 and 40. The wire 119 is stretched across a mounting plate 121 from which it is separated at either end by a spacer block, and the plate is further carried on brackets 123 where it is detachably mounted with screws 125. The wire 119 is electrically charged under the direction of microprocessor-based control box 34 while carriage 28 is past completely over the surface of a blanket-frame mounted piece of film 22.

Figure 3:
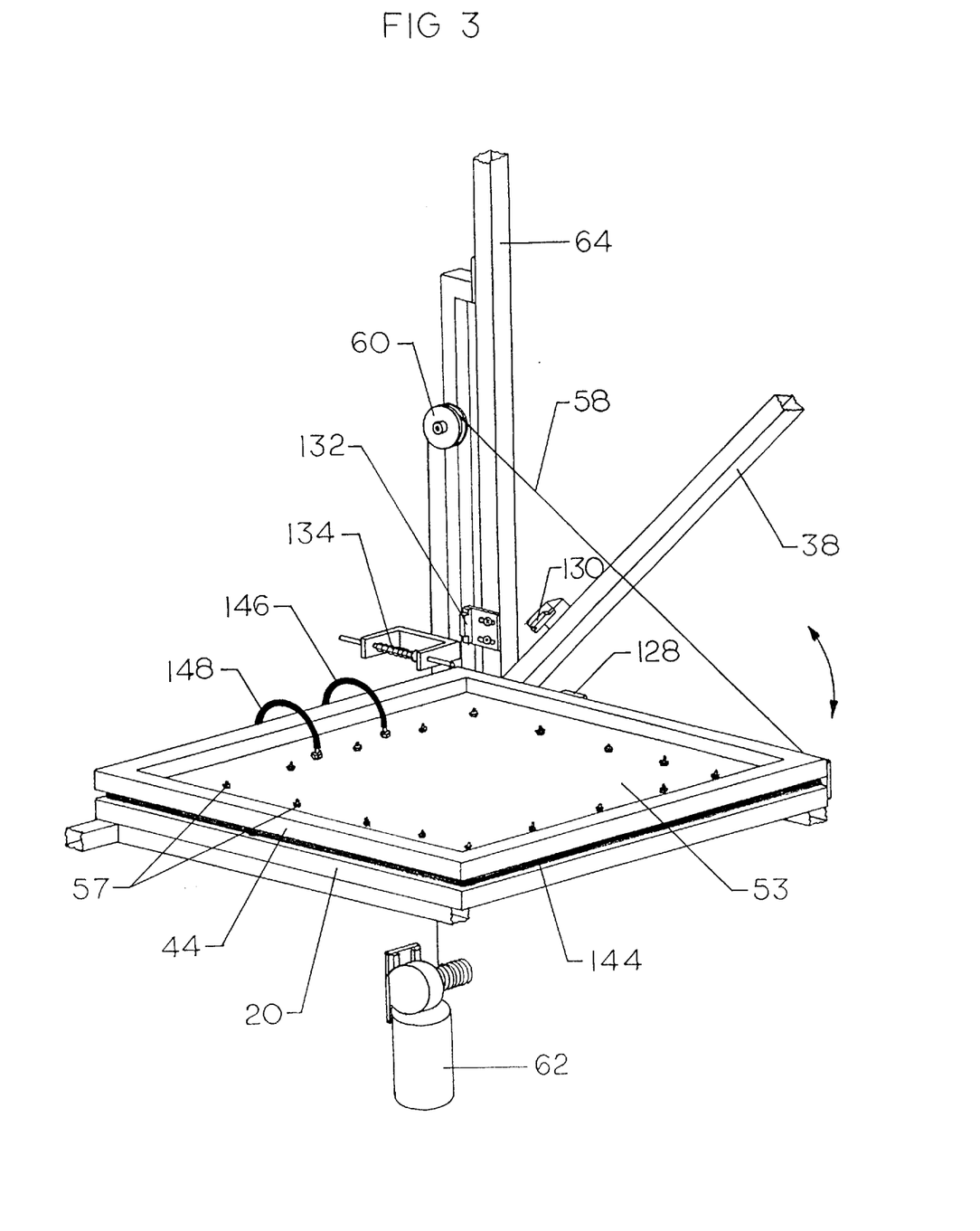
FIG. 3 is a partial perspective view of the blanket frame of the device of FIGS. 1 and 2 omitting various structural components to facilitate an operating description, and showing the blanket frame pivoted to a horizontal position.

As shown in FIG. 3, a first magnetic proximity switch 128 is affixed to the outer frame edge of glass frame 20 to detect the horizontal placement of blanket frame 44 therealong. A second magnetic proximity switch 130 is mounted on diagonal member 38 to sense the rotated positioning of blanket frame 44 between diagonal members 38 and 40 prior to electrically charging a supported piece of film with carriage 28. Finally, a third magnetic proximity switch 132 is supported on vertical member 64 at a location which detects the vertical positioning of blanket frame 44 between the vertical members 64 and 66. Additionally, a spring-biased plunger rod 134 engages the backface of blanket frame 44 to produce a positive bias against the raised blanket frame 44 which downwardly drives the frame when it is lowered.

FIG. 6 depicts a wand-activated electrical trigger switch 136 and 138 provided at the topmost and lowermost rack positions. When the charging carriage contacts each trigger switch, power to motor 104 is terminated, and microprocessor-based control box 34 resets the polarity to the motor in order to reverse its direction when power is next re-applied.

FIG. 5 depicts a second set of wand-activated electrical trigger switches 140 and 142 which are mounted on support bars 61 adjacent the uppermost and lowermost positions for vacuum carriage 50. Switches 140 and 142 measure end position of the carriage as they contact a switch which shuts off power to motor 90 and resets microprocessor-based control box 34 to change direction of motor 90 when power is reapplied.

Each of the various switches 128–142 depicted in the above mentioned figures can be further utilized to monitor safe operation of machine 10 in order to prevent inadvertent start-up of a plurality of motors 62, 90, and 104 when it is not desirable to do so. For example, concurrent operation of motor 90 to lower vacuum carriage 50 while motor 62 is raising blanket frame 44 can cause a collision therebetween resulting in significant damage to the respective components. Through utilization of a commonly available microprocessor having related memory and controllers, microprocessor-based control box 34 can be used to automatically coordinate operation of the machine 10 which directs electrical activation and deactivation of the respective motor components. Alternatively, each operation can be separately switch-actuated by a human operator who first loads a negative 18 and film 22 into the machine, and then subsequently closes door 14 to charge, expose, and develop the film within the machine.

Operating Procedure

To utilize the film processing machine 10 of this invention, a human operator first positions a negative image (or positive image) onto a glass frame 20 while door 14 is opened, as shown in FIG. 1. Subsequently, a piece of film 22 is positioned over the negative 18, and door 14 is subsequently closed which seals out light. A light-tight environment is thereby created inside the enclosure 12 in which the film is activated, exposed, and developed. Commonly, Verde VSX digital film will be utilized in this operating procedure. A Verde VSX digital film requires an activation stage and a development stage during utilization. First, a negative electrical charge is applied to an emulsion side of the film, subsequent to which an image is positioned in vacuum contact thereagainst and a light exposure is provided. Subsequently, the backface of the exposed film 22 is heated which heat develops the film and traps an image photographically therein.

Once machine 10 is loaded with a negative 18, and film 22 and door 14 is closed, blanket frame 44 is lowered to a horizontal position as depicted in FIG. 3. A vacuum is applied via vacuum tube 146 which communicates with the backface of blanket frame 44 to apply vacuum via perforations 56 in platen 52 and seal 54. As a result, the film 22 is firmly engaged with platen 52 where it is supported thereagainst.

Once engaged by a vacuum, both film 22 and blanket frame 44 are raised via motor 62 to an angled and elevated position inside carriage support frame 36. Subsequently, motor 104 is activated to first lower the electrostatic charging carriage 28 to a downwardmost position, and then raise carriage 28 while the changing wire 119 is electrically activated to charge the film 22 as carriage 28 is subsequently raised thereadjacent. Preferably, the film 22 is only electrostatically charged by wire 119 during upward motion of the carriage 28. Alternatively, the film could be charged during downward motion, or during both downward and upward motion.

Subsequent to charging film 22 with wire 119, the unexposed film is sensitized afterwhich it is transported back to its original horizontal position as shown in FIG. 3. Once blanket frame 44 is lowered to its horizontal position, a main vacuum is applied to blanket frame 44 through tube 148 and port 149 in plate 53 outside of platen 52, seal 54, and edges of film 22 to evacuate the air in the space between blanket frame 44 and glass frame 20 and sealed by fully encompassing seal 144 to remove voids and airgaps between the film 22 and image 18, bringing them in intimate contact. Preferably, vacuum is simultaneously applied via vacuum tube 146 to perforations 56 for at least an initial period of time to speed said contact by lessening the trapping of air.

After the said main vacuum has been applied for a predetermined period of time to assure said contact is achieved, point light source 14 is activated to expose image 18 onto film 22. Subsequent to exposure, the said main vacuum is released and blanket frame 44 is raised along with exposed film 22 to a vertical position as shown in FIG. 2. Once the blanket frame 44 reaches the vertically elevated position, vacuum carriage 50 is subsequently lowered to a position adjacent with the blanket frame 44 and film 22 as shown in FIG. 8.

Figure 8:
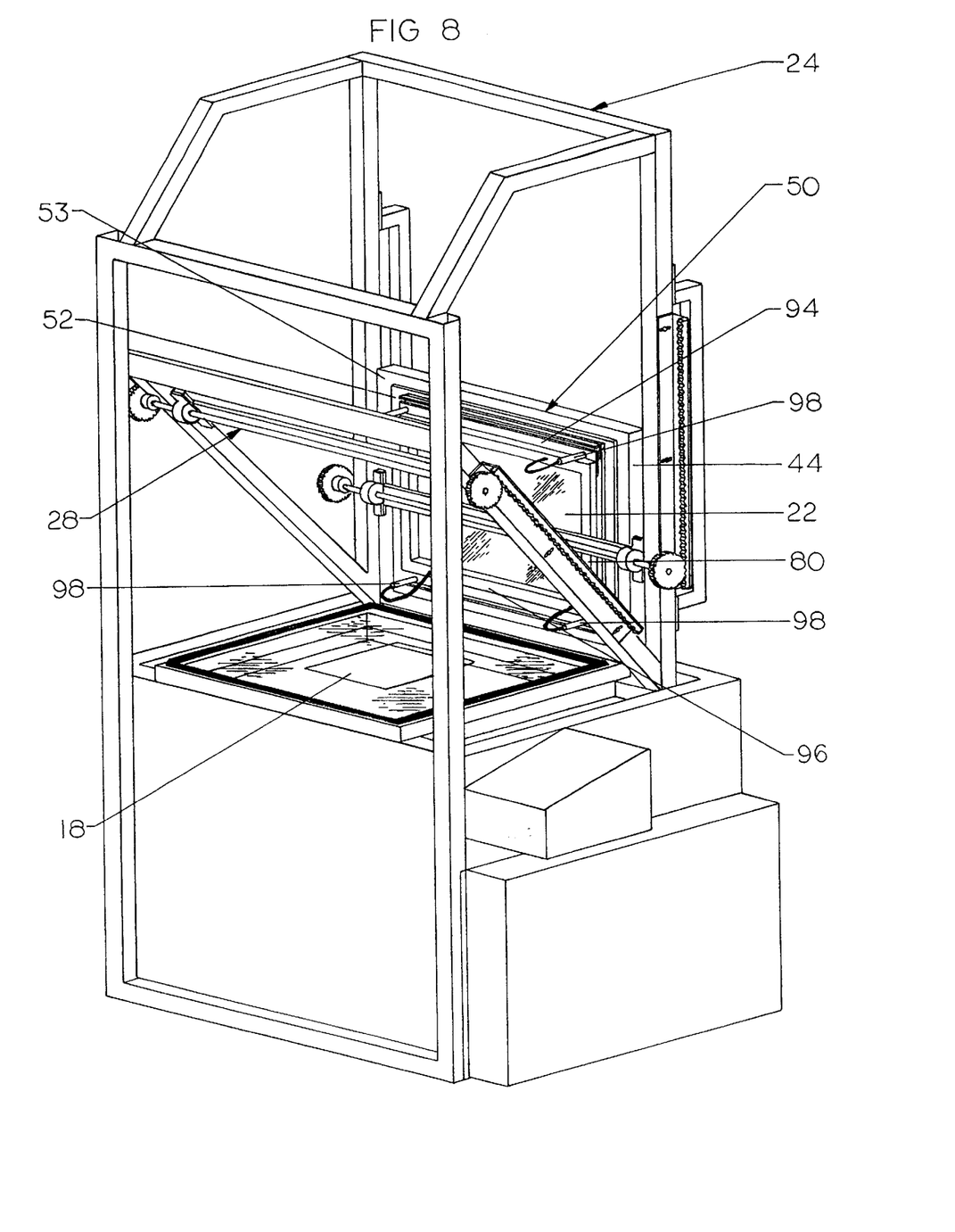
FIG. 8 is a partial perspective view of the device of FIGS. 1 and 2 and further omitting various structural components to facilitate an operating description, and showing the blanket frame raised to a vertical position with the vacuum carriage disposed in a downward position.
Figure 9:
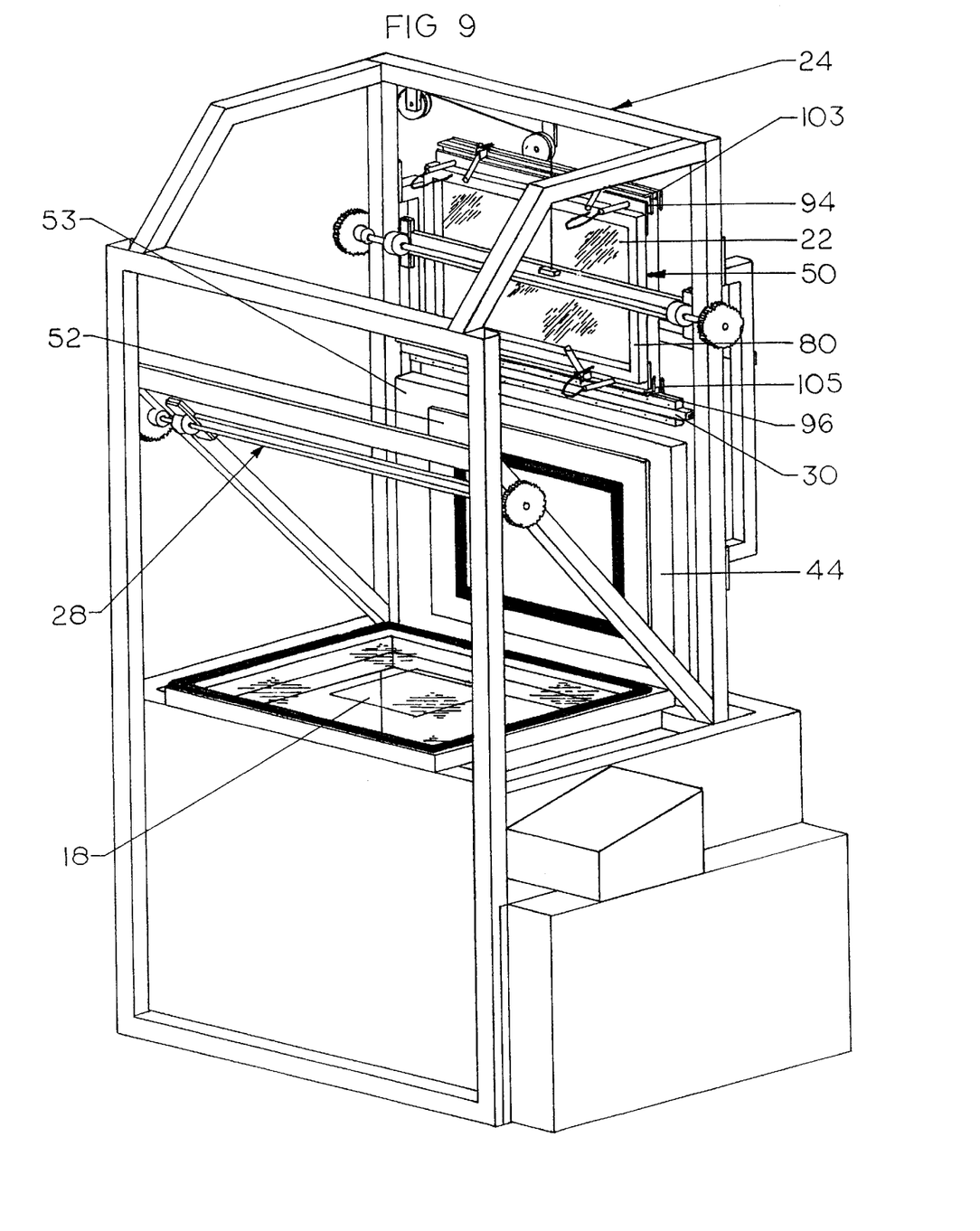
FIG. 9 is a partial perspective view of the device of FIGS. 1 and 2 and further omitting various structural components to facilitate an operating description, and showing the vacuum carriage raised to an upward position.

In its lowered configuration as depicted in FIG. 8, vacuum carriage 50 is pneumatically charged which extends pneumatic cylinders 98 and rearwardly biases vacuum bars 94 and 96 in engagement with the film 22 affixed to vacuum carriage platen face 52. Subsequently, a vacuum is applied to bars 94 and 96 through corresponding foam rubber seals 100 having perforations 102 such that the film 22 is vacuum engaged with the vacuum carriage 50, as well as the blanket frame 44. Next, the vacuum to the blanket frame 44 is released, and pneumatic cylinders which have internal retraction springs are bled which retracts the cylinders, bars 94 and 96, and attached film 22 away from flat face 52.

Once retracted, vacuum carriage 50 is raised to an elevated position as shown in FIG. 5. The heating element 30 which is already being maintained at the correct temperature, heats film 22 along its back face as vacuum carriage 50 is vertically raised thereadjacent, exposing the film back face to heating element 30 while it is lifted vertically therealong. Application of heat from heating element 30 to the back face of film 22 serves to deactivate and develop the exposed film afterwhich it can be readily handled without affecting its exposed images. It is necessary that the film 22 be heated on the non-emulsion side, or back side or else the emulsion which contacts negative 18 will be damaged.

To properly develop the film, the heating element 30 must be in physical contact with the film 22. Preferably, a pair of top and bottom positive clamps 103 and 105 are actuated to clamp the film along bars 94 and 96 before the carriage is raised to an elevated position to further secure the film. Thereinafter, the carriage 50 is transported vertically such that the top positive clamp 103 is just above heating element 30. Air cylinder 107 is then activated causing the heating element 30 to be pushed forward in close proximity to the film. A low level vacuum is then applied via perforations 109 in heating element 30 to pull the film in physical contact with the heater element. The carriage continues to transport upwards with the film in contact with the heater element 30 until the bottom positive clamp 105 is just short of touching heating element 30. Subsequently, the vacuum to heater element 30 is released, air cylinder 107 is deactivated causing the heating element 30 to retract away from the carriage, and top and bottom clamps 103 and 105 are released.

Vacuum carriage 50 is then lowered back to the position depicted in FIG. 8, subsequent to which pneumatic cylinders 98 are again actuated, blanket frame 44 is evacuated to engage the film, cylinders 98 are deactivated to release the film from carriage 50, and carriage 50 is raised back to the elevated position of FIG. 5. As a result, the exposed and developed film 22 is retained on vacuum carriage 50 which is pivoted downward to the configuration of FIG. 3 subsequent to which a vacuum is released via tube 146, depositing the film on top of the negative 18. Finally, frame 44 is raised allowing for removal of the exposed and developed film by lowering door 14.

Utilization of an alternative type of image-recording film, namely Verde VIX digital film, requires an activation stage, a deactivation stage, and a heat development stage in order to form and trap an image therein. First, a positive charge is applied to the emulsion side of the film, subsequent to which an image is positioned in vacuum contact thereagainst, and a light exposure is provided. A flood lamp exposure is subsequently provided to the emulsion side of the film, and then a negative charge is provided also on the emulsion side to deactivate the film.

Finally, heat is applied to the film backface which heat develops the film and traps an image therein. In order to implement this variation, charging carriage 28 first applies a positive charge, and subsequent to exposure applies a negative charge to the film. Secondly, a flood exposure lamp 152, which is shown in dashed lines optionally in FIG. 2 is provided behind door 14 in a bottom portion of opening 16. Lamp 152 is activated subsequent to exposure, afterwhich charging carriage 28 is used in combination with blanket frame 44 to transport and negatively charge the film prior to heat development by vacuum carriage 52 and heating element 30. Preferably, a human operator instructs the microprocessor control box, via a switch, which film is being utilized.

It is to be understood that the invention is not limited to the exact construction illustrated and described above, but that various changes and modifications may be made without departing from the spirit and scope of the invention as defined in the following claims.

I claim:

1. A device for use in a machine for light exposing and developing images on a film requiring at least a film-activating operation prior to light exposure of an image, the device comprising:

a blanket frame juxtaposed to a frame transparent portion, said blanket frame having means movable between first and second positions for opening and closing movements relative to said frame transparent portion and providing for nested engagement with said frame, said blanket frame having a vacuum engaging platen face to which is applied a vacuum which engages said film against said platen face during movable positioning of said blanket frame and said film, and a carriage within a complete ambient light-blocking enclosure within the said machine, said carriage movable between a first and second position and having gripping means for gripping said film so as to remove said film from said blanket frame while said blanket frame is held in an open position relative to said frame transparent portion and support said film on said carriage while transporting said film between a first and second position therein.

2. The device of claim 1 further comprising a heating element provided substantially adjacent said carriage such that said carriage transports said film towards said heating element to heat a backface of said exposed film which heat-develops said film.

3. The device of claim 2 wherein said heating element has a vacuum face to which is applied a vacuum which pulls said film against said face to heat develop said film.

4. The device of claim 1 wherein said carriage gripping means is a vacuum carriage having perforations along film contacting portions which apply a vacuum therethrough to vacuum-grip said film thereagainst.

5. The device of claim 4 further including cylinder means for positively engaging said vacuum carriage against said film for application of a vacuum thereagainst, wherein said cylinder means subsequently retract therefrom prior to carriage motion between a first and second position.

6. The device of claim 5 wherein said cylinder means comprise a plurality of cylinders supporting at least one vacuum bar having said perforations therealong for vacuum-gripping said film such that said cylinders are extended to engage said vacuum bar against said film and retracted to transport said film away from a surface supporting said film.

7. The device of claim 6 wherein a first plurality of cylinders are provided for vacuum-gripping said film along a first vacuum bar wherein said respective cylinders are angled slightly inwardly toward a second plurality of cylinders and vacuum bar such that cylinder extension of said first vacuum bar and second vacuum bar decreases the respective distances therebetween so that said film which is gripped while in the extended position is thereafter film-tightened as said cylinders are retracted which increases the bar-distance therebetween and membrane-stretches said film toward said retracted position therealong.

8. A device for use in a machine for light exposing and developing images on a film requiring at least a film-activating operation prior to light exposure of an image, the device comprising:

a carriage for transporting said film subsequent to a blanket frame having picked up said film in said machine provided within a complete ambient light-blocking enclosure within the said machine, said carriage movable between a first and second position and having gripping means for gripping said film so as to remove said film from said blanket frame and support said film on said carriage while transporting said film between a first and second position therein, and a heating element provided substantially adjacent said carriage such that said carriage transports said film towards said heating element to heat a backface of said exposed film which heat-develops said film.

9. A device of claim 8 wherein said heating element has a vacuum face to which is applied a vacuum which pulls said film against said face to heat develop said film.

10. A device for use in a machine for light exposing and developing images on a film requiring at least a film-activating operation prior to light exposure of an image, the device comprising:

a carriage for transporting said film subsequent to a blanket frame having picked up said film in said machine provided within a complete ambient light-blocking enclosure within the said machine, said carriage movable between a first and second position and having gripping means for gripping said film so as to remove said film from said blanket frame and support said film on said carriage while transporting said film between a first and second position therein, and said carriage gripping means is a vacuum carriage having perforations along film contact portions which apply a vacuum therethrough to vacuum-grip said film thereagainst.

11. The device of claim 10 further including cylinder means for positively engaging said vacuum carriage against said film for application of a vacuum thereagainst, wherein said cylinder means subsequently retract therefrom prior to carriage motion between a first and second position.

12. The device of claim 11 wherein said cylinder means comprise a plurality of cylinders supporting at least one vacuum bar having said perforations therealong for vacuum-gripping said film such that said cylinders are extended to engage said vacuum bar against said film and retracted to transport said film away from a surface supporting said film.

13. The device of claim 12 wherein a first plurality of cylinders are provided for vacuum-gripping said film along a first vacuum bar wherein said respective cylinders are angled slightly inwardly toward a second plurality of cylinders and vacuum bar such that cylinder extension of said first vacuum bar and second vacuum bar decreases the respective distances therebetween so that said film which is gripped while in the extended position is thereafter film-tightened as said cylinders are retracted which increases the bar-distance therebetween and membrane-stretches said film toward said retracted position therealong.

14. A device for use in a machine for light exposing and developing images on a film requiring at least a film-activating operation prior to light exposure of an image, the device comprising:

a carriage for transporting said film subsequent to light exposure in the machine providing within a completely ambient light-blocking enclosure within said machine, said carriage movable between a first and second position and having gripping means for gripping said film so as to support said film on said carriage while transporting said film between a first and second position therein;

a heating element provided substantially adjacent said carriage such that said carriage transports said film toward said heating element to heat a backface of said exposed film which heat-develops said film;

wherein said heating element having a vacuum face to which is applied a vacuum which pulls said film against said face to heat develop said film.

15. A device for use in a machine for light exposing and developing images on a film requiring at least a film-activating operation prior to light exposure of an image and a heat development operation following exposure, the device comprising:

a carriage for transporting said film subsequent to light exposure in the machine provided within a completely ambient light-blocking enclosure within the machine, said carriage moveable between a first and second position and having gripping means for gripping said film so as to support said film on said carriage while transporting said film between a first and second position therein;

wherein said carriage gripping means is a vacuum carriage having perforations along film contacting portions which apply a vacuum therethrough to vacuum-grip said film thereagainst;

cylinder means for positively engaging said vacuum carriage against said film for application of a vacuum thereagainst, wherein said cylinder means subsequently retract therefrom prior to carriage motion between a first and second position;

wherein said cylinder means comprise a plurality of cylinders supporting at least one vacuum bar having said perforations therealong for vacuum-gripping said film such that said cylinders are extended to engage said vacuum bar against said film and retracted to transport said film away from a surface supporting said film.

16. A self contained machine for light exposing and developing images on a film requiring a film-activating operation prior to light exposure of an image and a heat development operation following exposure, the machine comprising:

a light-blocking barrier enclosure having an opening for receiving the image and said film and a means for covering the opening to completely light-block said enclosure;

a support frame transparent portion for receiving the image and said film in nested engagement;

a light to be directed at said frame transparent portion operable to light expose the image onto said film;

a blanket frame juxtaposed to said frame transparent portion, said blanket frame having means movable between first and second positions for opening and closing movements relative to said frame transparent portion and providing for nested engagement with said frame, said blanket frame having a vacuum engaging platen face to which is applied a vacuum which engages said film against said platen face during movable positioning of said blanket frame and said film;

an electrostatic charging carriage supported in said enclosure for substantially planar motion along said film while supported in an elevated position by said blanket frame;

a vacuum carriage provided in said enclosure for planar motion between a first and second position having a cylindrically engaging portion for vacuum-gripping said film when positioned on said blanket frame so as to vacuum support said film on said vacuum carriage subsequent to remove the vacuum from said blanket frame; and a heating element provided substantially adjacent said carriage such that said carriage transports said film towards said heating element to heat a backface of the exposed film which heat-develops said film.

17. A device for manipulating and moving a piece of film for use in a selfcontained machine which light exposes and develops images on said film requiring a film-activating operation prior to light exposure of the image, said machine comprising:

a blanket frame which is juxtaposed to a support frame transparent portion in snug registry with a peripheral sealing bead, defining a contact printing chamber, said blanket frame moveable between first and second positions to provide for opening and closing movements relative to said support frame transparent portion on which said film and image are nested, a vacuum conduit communicating with said contact printing chamber for evacuating the air in said contact printing chamber, said device comprising said blanket frame having a vacuum engaging platen face to which is applied a vacuum which engages said film against said platen face for moveable positioning of said blanket frame and said film within said machine, and means for charging said film while said blanket frame and said film are held in a first open position relative to said support frame transparent portion and are in a completely light blocking portion of said machine.

18. The device of claim 17 wherein said charging means is an electrostatic charging carriage provided about said blanket frame while said blanket frame is in said first open position, wherein said charging carriage is supported in said machine enclosure for substantially planar motion along said film to charge said film while supported in such position by said blanket frame.

* * * * *